(12) United States Patent
Wariishi et al.

(10) Patent No.: US 7,368,199 B2
(45) Date of Patent: May 6, 2008

(54) FUEL CELL STACK

(75) Inventors: Yoshinori Wariishi, Utsunomiya (JP); Narutoshi Sugita, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 10/970,554

(22) Filed: Oct. 20, 2004

(65) Prior Publication Data
US 2005/0158604 A1    Jul. 21, 2005

(30) Foreign Application Priority Data
Oct. 20, 2003    (JP)    ............................. 2003-359047

(51) Int. Cl.
*H01M 8/10* (2006.01)
*H01M 2/08* (2006.01)
(52) U.S. Cl. .......................................... 429/34; 429/38
(58) Field of Classification Search .................. 429/34, 429/36, 163, 164, 157, 177, 32, 38, 39
See application file for complete search history.

(56) References Cited

U.S. PATENT DOCUMENTS 5,114,807 A    5/1992    Rowlette

| 5,308,718 | A | * | 5/1994 | Eidler et al. | ................. | 429/152 |
| 2002/0142209 | A1 | * | 10/2002 | Kikuchi et al. | ............... | 429/34 |
| 2005/0053824 | A1 | | 3/2005 | Strobel et al. | | |

FOREIGN PATENT DOCUMENTS

| JP | 9-92324 A | 4/1997 |
| JP | 2000-48850 A | 2/2000 |
| JP | 2001-135344 | 5/2001 |
| JP | 2002-298901 A | 10/2002 |
| WO | WO-03/044885 A2 | 5/2003 |

OTHER PUBLICATIONS

Canadian Office Action for Application No. 2,485,042, dated Nov. 15, 2007.

* cited by examiner

*Primary Examiner*—Patrick Joseph Ryan
*Assistant Examiner*—Monique Wills
(74) *Attorney, Agent, or Firm*—Lahive & Cockfield, LLP; Anthony A. Laurentano

(57) ABSTRACT

A casing includes end plates and first through fourth side plates. The first and third side plates are short, and the second and fourth side plates are long. At least cross sectional areas or shapes of the first through fourth side plates are determined such that the sides of the end plates have substantially the same deflection in the stacking direction.

6 Claims, 9 Drawing Sheets

FUEL CELL STACK

BACKGROUND OF THE INVENTION

1. Field of the Invention

The present invention relates to a fuel cell stack including a box-shaped casing and a stack body in the casing. The stack body is formed by stacking a plurality of unit cells. Each of the unit cells includes an electrolyte electrode assembly and a pair of separators sandwiching the electrolyte electrode assembly. The electrolyte electrode assembly includes a pair of electrodes, and an electrolyte interposed between the electrodes.

2. Description of the Related Art

For example, a solid polymer fuel cell employs a membrane electrode assembly which includes an anode and a cathode, and an electrolyte membrane (electrolyte) interposed between the anode and the cathode. The electrolyte membrane is a polymer ion exchange membrane. Each of the anode and the cathode is made of electrode catalyst layer of noble metal formed on a base material chiefly containing carbon. The membrane electrode assembly and separators sandwiching the membrane electrode assembly make up a unit of a fuel cell.

In the fuel cell, a fuel gas such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electric current. A gas chiefly containing oxygen or air (hereinafter also referred to as the oxygen-containing gas) is supplied to the cathode. At the cathode, the hydrogen ions from the anode combine with the electrons and oxygen to produce water.

Generally, a predetermined number of, e.g., several tens to several hundreds of fuel cells are stacked together to form a fuel cell stack for achieving the desired level of electricity in power generation. Components of the fuel cell stack need to be tightened together so that the internal resistance of the fuel cell does not increase, and the sealing characteristics for preventing leakage of reactant gases can be maintained.

In this regard, a fuel cell stack as disclosed in Japanese laid-open patent publication No. 2001-135344 is known. As shown in FIG. 9, the fuel cell stack includes a stack body 2 formed by stacking a plurality of unit cells 1. End plates 3 are provided at opposite ends of the stack body 2 in the stacking direction. Further, auxiliary plates 4a, 4b are provided outside the end plates 3.

A pair of tightening bands 5 are provided along both sides of the stack body 2. Cylindrical coupling members 6 are provided such that holes of the coupling members 6 are arranged in a line respectively at ends of the tightening bands 5, and the auxiliary plates 4a, 4b. Metal pins 7 are inserted into the holes of the cylindrical members 6. Thus, the tightening bands 5, and the auxiliary plates 4a, 4b are coupled together.

According to the disclosure of Japanese laid-open patent publication No. 2001-135344, a plurality of bolts 8 are screwed into holes of the auxiliary plate 4a, and a plurality of belleville springs 9 are arranged on the auxiliary plate 4b. When the bolts 8 are screwed into the auxiliary plate 4a, the end plate 3 is pressed toward the auxiliary plate 4b, and the belleville springs 9 on the auxiliary plate 4b are compressed. Accordingly, the required tightening force is applied to the stack body 2 between the pair of end plates 3.

However, in the conventional technique disclosed in Japanese laid-open patent publication No. 2001-135344, the end plates 3 may have a rectangular shape. In this case, if a same load is applied to the short sides of the end plates 3 and the long sides of the end plates 3, the deflection in the short sides is different from the deflection in the long sides.

Therefore, if the surface pressure varies in the fuel cell stack due to the thermal expansion, the expansion of the electrolyte membrane, or the creep of the membrane electrode assembly, the uniform surface pressure is not maintained in each of the fuel cells 1. Thus, the power generation performance and sealing characteristics of the fuel cell stack are lowered.

SUMMARY OF THE INVENTION

A main object of the present invention is to provide a fuel cell stack having a simple and small structure in which the desired power generation performance and sealing characteristics are achieved.

According to the present invention, a fuel cell stack includes a box-shaped casing and a stack body provided in the box-shaped casing. The stack body is formed by stacking a plurality of unit cells in a stacking direction. Each of the unit cells includes an electrolyte electrode assembly and a pair of separators sandwiching the electrolyte electrode assembly. The casing includes rectangular end plates provided at opposite ends of the stack body in the stacking direction and a plurality of side plates provided on sides of the stack body, and coupled to respective sides of the end plates. At least areas of cross sections or shapes of the side plates are determined such that the sides of the end plates have substantially the same deflection in the stacking direction.

Further, according to the present invention, the rigidity of long sides of the end plates and the rigidity of short sides of the end plates are substantially the same such that the sides of the end plates have substantially the same deflection in the stacking direction.

It is preferable that the end plates partially include thick sections or thin sections for changing the thickness so that the rigidity of long sides of the end plates and the rigidity of short sides of the end plates are substantially the same.

Further, it is preferable that areas of cross sections of the side plates in a direction perpendicular to the stacking direction are substantially the same.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
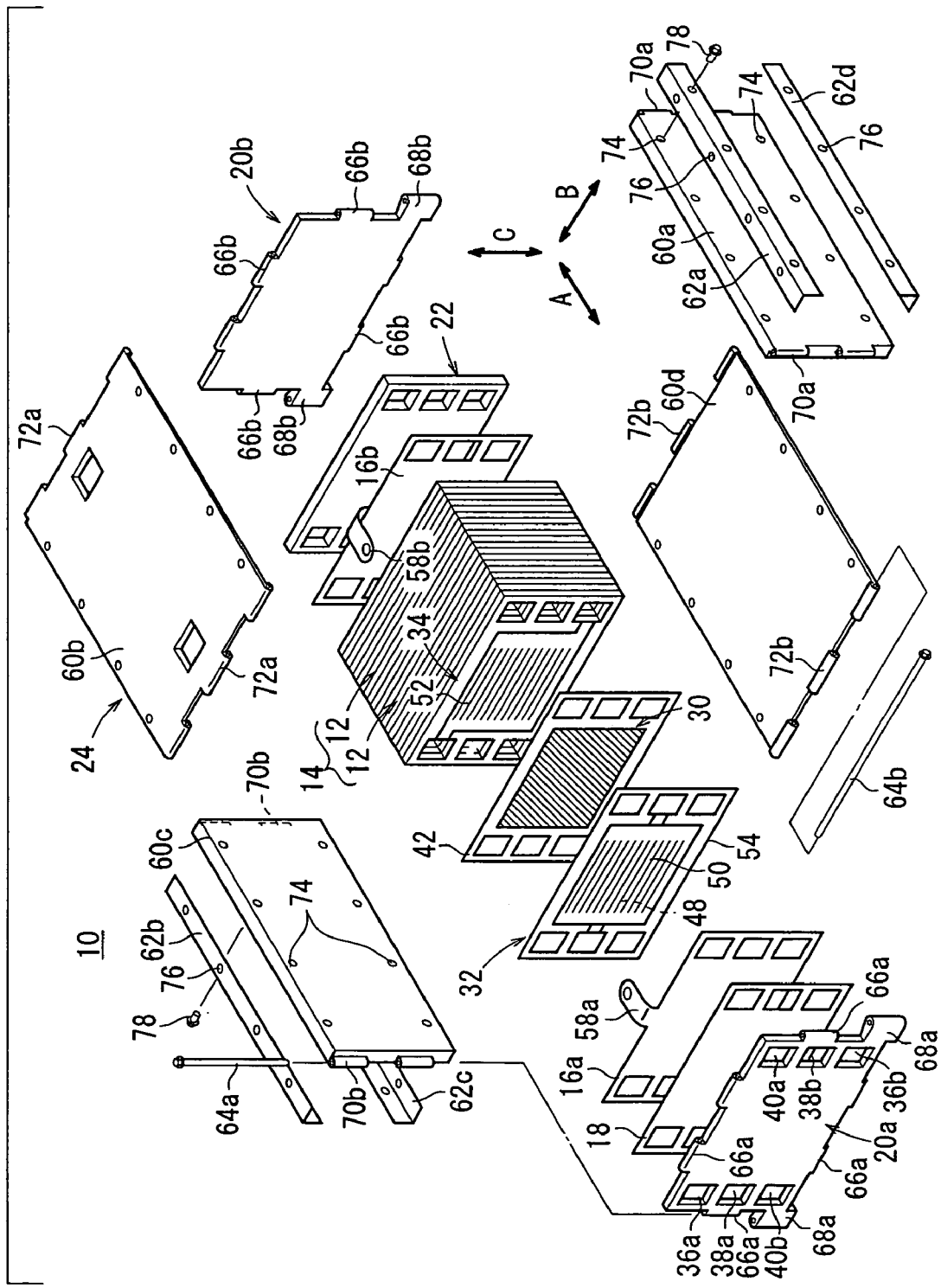
FIG. 1 is an exploded perspective view schematically showing part of a fuel cell stack according to a first embodiment of the present invention.
Figure 2:
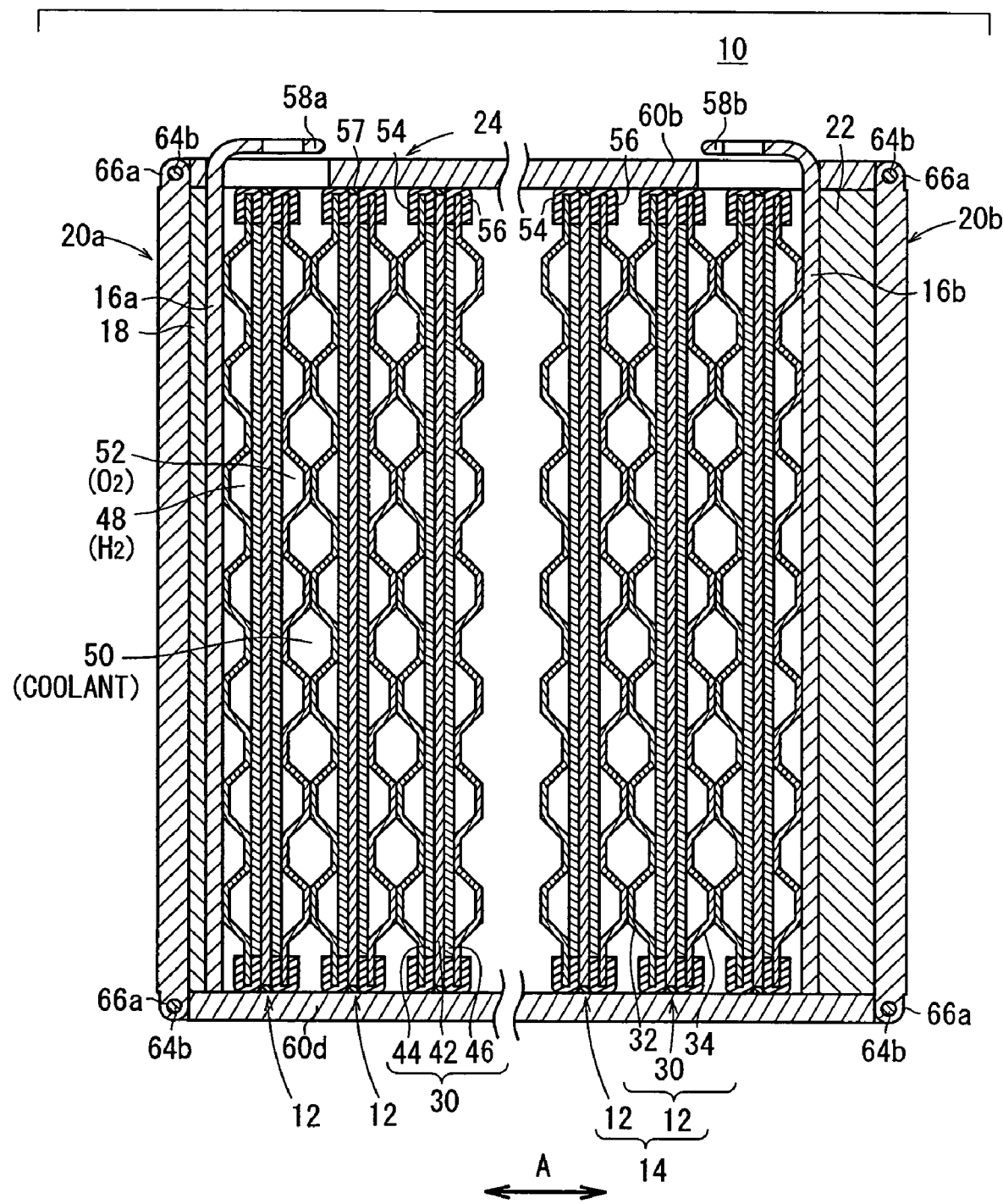
FIG. 2 is a cross sectional side view showing part of the fuel cell stack.

FIG. 1 is an exploded perspective view schematically showing part of a fuel cell stack 10 according to a first embodiment of the present invention. FIG. 2 is a cross sectional side view showing part of the fuel cell stack 10.

As shown in FIG. 1, the fuel cell stack 10 includes a stack body 14 formed by stacking a plurality of unit cells 12 horizontally in a stacking direction indicated by an arrow A. At an end of the stack body 14 in the stacking direction indicated by the arrow A, a terminal plates 16a is provided. An insulating plate 18 is provided outside the terminal plate 16a. Further, an end plate 20a is provided outside the insulating plate 18. At the other end of the stack body 14 in the stacking direction, a terminal plate 16b is provided. An insulating spacer member 22 is provided outside the terminal plate 16b. Further, an end plate 20b is provided outside the insulating spacer member 22. Each of the end plates 20a, 20b has a horizontally long rectangular shape in a front view. The fuel cell stack 10 is assembled together such that the stack body 14 formed by stacking the unit cells 12 is housed in a casing 24 including the end plates 20a, 20b.

Figure 3:
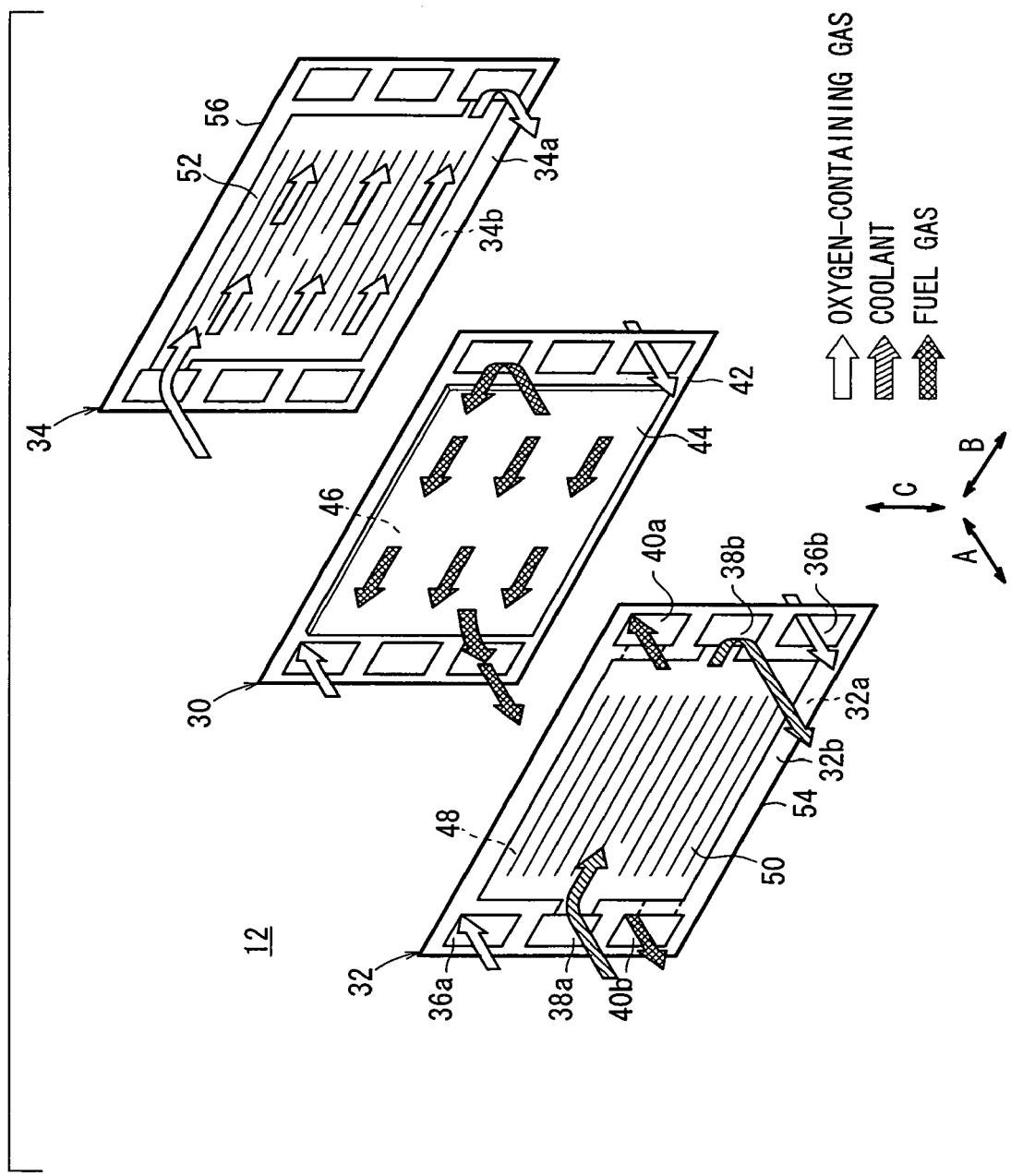
FIG. 3 is an exploded perspective view showing a unit cell of the fuel cell stack.

As shown in FIGS. 2, 3, each of the unit cells 12 includes a membrane electrode assembly (electrolyte electrode assembly) 30 and first and second metal separators 32, 34 sandwiching the membrane electrode assembly 30. The first and second metal separators 32, 34 are thin corrugated plates. Instead of using the first and second metal separators 32, 34, carbon separators (not shown) may be used, for example.

At one end of the unit cell 12 in a longitudinal direction indicated by an arrow B in FIG. 3, an oxygen-containing gas supply passage 36a for supplying an oxygen-containing gas, a coolant supply passage 38a for supplying a coolant, and a fuel gas discharge passage 40b for discharging a fuel gas such as a hydrogen-containing gas are provided. The oxygen-containing gas supply passage 36a, the coolant supply passage 38a, and the fuel gas discharge passage 40b extend through the unit cell 12 in the direction indicated by the arrow A.

At the other end of the unit cell 12, a fuel gas supply passage 40a for supplying the fuel gas, a coolant discharge passage 38b for discharging the coolant, and an oxygen-containing gas discharge passage 36b for discharging the oxygen-containing gas are provided. The fuel gas supply passage 40a, the coolant discharge passage 38b, and the oxygen-containing gas discharge passage 36b extend through the unit cell 12 in the direction indicated by the arrow A.

The membrane electrode assembly 30 includes an anode 44, a cathode 46, and a solid polymer electrolyte membrane 42 interposed between the anode 44 and the cathode 46. The solid polymer electrolyte membrane (electrolyte) 42 is formed by impregnating a thin membrane of perfluorosulfonic acid with water, for example.

Each of the anode 44 and the cathode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 44 and the electrode catalyst layer of the cathode 46 are fixed to both surfaces of the solid polymer electrolyte membrane 42, respectively.

The first metal separator 32 has a fuel gas flow field 48 on its surface 32a facing the membrane electrode assembly 30. The fuel gas flow field 48 is connected to the fuel gas supply passage 40a at end, and connected to the fuel gas discharge passage 40b at the other end. The fuel gas flow field 48 includes a plurality of grooves extending in the direction indicated by the arrow B, for example. Further, the first metal separator 32 has a coolant flow field 50 on the other surface 32b. The coolant flow field 50 is connected to the coolant supply passage 38a at one end, and connected to the coolant discharge passage 38b at the other end. The coolant flow field 50 includes a plurality of grooves extending in the direction indicated by the arrow B.

The second metal separator 34 has an oxygen-containing gas flow field 52 on its surface 34a facing the membrane electrode assembly 30. The oxygen-containing gas flow field 52 is connected to the oxygen-containing gas supply passage 36a at one end, and connected to the oxygen-containing gas discharge passage 36b at the other end. The oxygen-containing gas flow field 52 includes a plurality of grooves extending in the direction indicated by the arrow B. The other surface 34b of the second metal separator 34 is stacked on the surface 32b of the first metal separator 32. When the first metal separator 32 and the second metal separator 34 are stacked together, the coolant flow field 50 is formed between the surface 32b of the first metal separator 32 and the surface 34b of the second metal separator 34.

A first seal member 54 is formed integrally on the surfaces 32a, 32b of the first metal separator 32 to cover (sandwich) the outer edge of the first metal separator 32. The first seal member 54 is provided around the fuel gas supply passage 40a, the fuel gas discharge passage 40b, and the fuel gas flow field 48 on the surface 32a of the first metal separator 32. The first seal member 54 is not provided between the fuel gas supply passage 40a and the fuel gas flow field 48, and between the fuel gas discharge passage 40b and the fuel gas flow field 48. Thus, the fuel gas supply passage 40a and the fuel gas discharge passage 40b are connected to the fuel gas flow field 48.

A second seal member 56 is formed integrally on the surfaces 34a, 34b of the second metal separator 34 to cover (sandwich) the outer edge of the second metal separator 34. The second seal member 56 is provided around the oxygen-containing gas supply passage 36a, the oxygen-containing gas discharge passage 36b, and the oxygen-containing gas flow field 52 on the surface 34a of the second metal separator 34. The second seal member 56 is not provided between the oxygen-containing gas supply passage 36a and the oxygen-containing gas flow field 52, and between the oxygen-containing gas discharge passage 36b and the oxygen-containing gas flow field 52. Thus, the oxygen-containing gas supply passage 36a and the oxygen-containing gas discharge passage 36b are connected to the oxygen-containing gas flow field 52.

The first seal member 54 is provided around the coolant supply passage 38a, the coolant discharge passage 38b, and the coolant flow field 50 on the surface 32*b* of the first metal separator 32. The second seal member 56 is provided around the coolant supply passage 38*a*, the coolant discharge passage 38*b*, and the coolant flow field 50 on the surface 34*b* of the second metal separator 32. The first seal member 54 and the second seal member 56 are not provided between the coolant supply passage 38*a* and the coolant flow field 50, and between the coolant discharge passage 38*b* and the coolant flow field 50. Thus, the coolant supply passage 38*a* and the coolant discharge passage 38*b* are connected to the coolant flow field 50.

As shown in FIG. 2, a seal 57 is interposed between the first and second seal members 54, 56 so that the outer edge of the solid polymer electrolyte membrane 42 does not directly contact the casing 24. A small clearance may be formed between the outer edges of the first and second seal members 54, 56, and an inner surface of the casing 24. Alternatively, the outer edges of the first and second seal members 54, 56 may be in contact with the inner surface of the casing 24. In the structure, the first and second metal separators 32, 34 are not deformed excessively beyond a predetermined extent.

As shown in FIGS. 1 and 2, plate-shaped terminals 58*a*, 58*b* extend from the terminal plates 16*a*, 16*b*, respectively. The terminals 58*a*, 58*b* are connected to a load such as a motor of a vehicle.

As shown in FIG. 1, the casing 24 includes the end plates 20*a*, 20*b*, first through fourth side plates 60*a* through 60*d*, angle members (e.g., L angles) 62*a* through 62*d*. The first through fourth side plates 60*a* through 60*d* are provided on sides of the stack body 14. The angle members 62*a* through 62*d* are used as coupling members for coupling adjacent ends of the first through fourth side plates 60*a* through 60*d*.

Each of upper and lower ends of the end plate 20*a* has two tabs 66*a*. Each of upper and lower ends of the end plate 20*b* has two tabs 66*b*. Each of left and right ends of the end plate 20*a* has one tab 66*a*. Each of left and right ends of the end plate 20*b* has one tab 66*b*. The end plate 20*a* has mounting bosses 68*a* on its left and right ends at lower positions. The end plate 20*b* has mounting bosses 68*b* on its left and right ends at lower positions. The bosses 68*a*, 68*b* are fixed to mounting positions (not shown) using bolts or the like for installing the fuel cell stack 10 in a vehicle, for example.

The first and third side plates 60*a*, 60*c* are provided on opposite sides of the stack body 14. Each of longitudinal ends of the first side plate 60*a* has two tabs 70*a*. Each of longitudinal ends of the third side plate 60*b* has two tabs 70*b*. The second side plate 60*b* is provided on the upper side of the stack body 14, and the fourth side plate 60*d* is provided on the lower side of the stack body 14. Each of longitudinal ends of the second side plate 60*b* has three tabs 72*a*. Each of longitudinal ends of the fourth side plate 60*d* has three tabs 72*b*.

In assembling the end plates 20*a*, 20*b* and the first through fourth side plates 60*a* through 60*d*, the left and right tabs 66*a* of the end plate 20*a* are positioned between the tabs 70*a* of the first side plate 60*a* and the tabs 70*b* of the third side plate 60*c*, and the left and right tabs 66*b* of the end plate 20*b* are positioned between the tabs 70*a* of the first side plate 60*a* and the tabs 70*b* of the third side plate 60*c*. Short coupling pins 64*a* are inserted to these tabs 66*a*, 66*b*, 70*a*, 70*b* for coupling the first and third side plates 60*a*, 60*c*, and the end plates 20*a*, 20*b*.

Likewise, the tabs 72*a* of the second side plate 60*b* and the tabs 66*a*, 66*b* of the upper ends of the end plates 20*a*, 20*b* are positioned alternately, and the tabs 72*b* of the fourth side plate 60*d* and the tabs 66*a*, 66*b* of the lower ends of the end plates 20*a*, 20*b* are positioned alternately. The long coupling pins 64*b* are inserted into these tabs 66*a*, 66*b*, 72*a*, 72*b* for coupling the second and fourth side plates 60*b*, 60*d* and the end plates 20*a*, 20*b*.

A plurality of screw holes 74 are formed along opposite edges of the first through fourth side plates 60*a* through 60*d*. The screw holes 74 are arranged in the direction indicated by the arrow A. Further, screw holes 76 are provided along the lengths of the angle members 62*a* through 62*d* at positions corresponding to the screw holes 74. Screws 78 are inserted into the screw holes 76 and the screw holes 74 to fix the first through fourth side plates 60*a* through 60*d* together using the angle members 62*a* through 62*d*. In this manner, the first through fourth side plates 60*a* through 60*d*, and the end plates 20*a*, 20*b* are assembled into the casing 24 (see FIG. 4).

Figure 5:
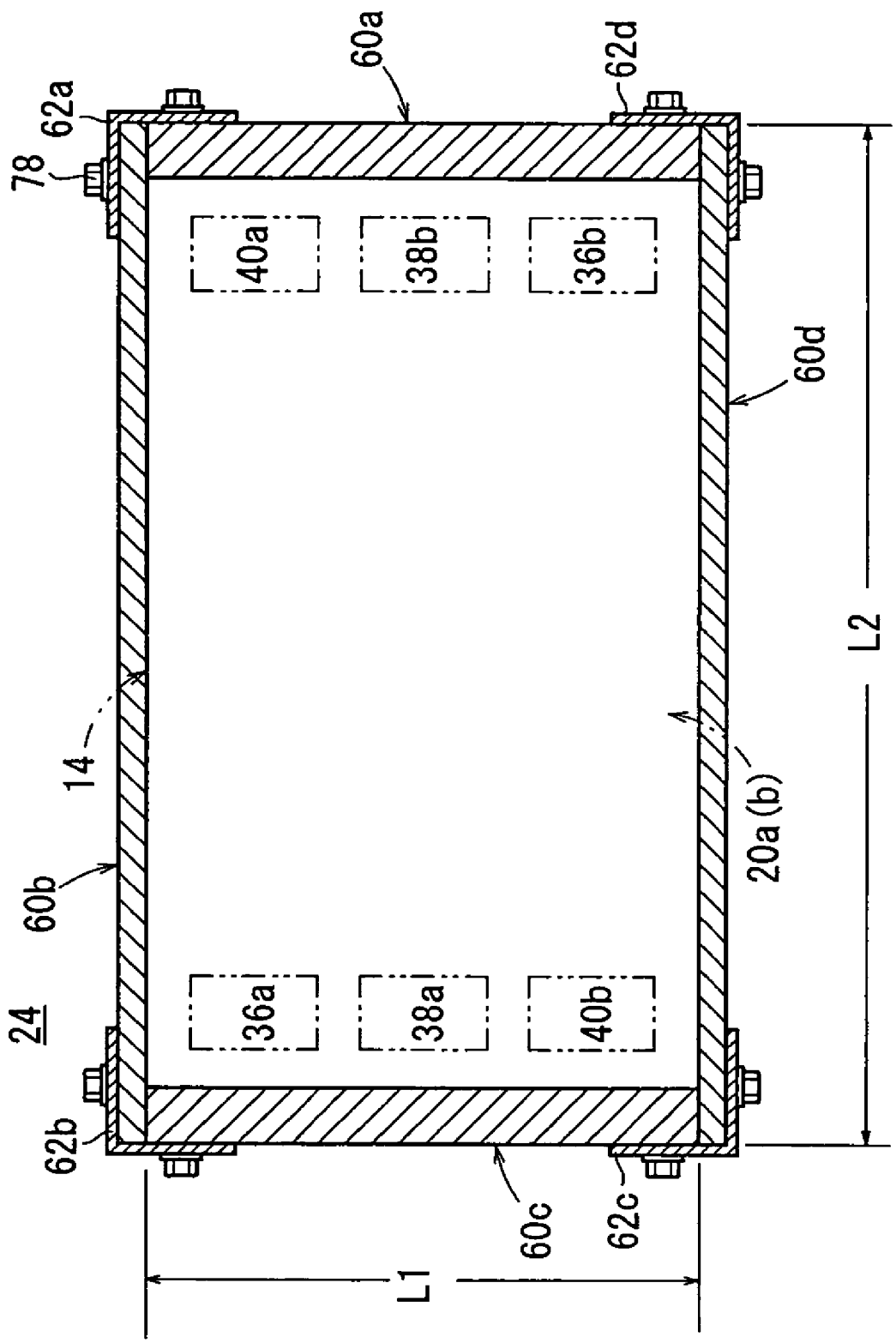
FIG. 5 is a cross sectional view showing a casing of the fuel cell stack.

As shown in FIG. 5, the first and third side plates 60*a*, 60*c* are relatively short, and have the width L1 corresponding to the short sides of the end plates 20*a*, 20*b*. The second and fourth side plates 60*b*, 60*d* are relatively long, and have the width L2 (L2>L1) corresponding to the long sides of the end plates 20*a*, 20*b*.

Cross sectional areas or shapes of at least the first through fourth side plates 60*a* through 60*d* are determined such that the respective sides of the end plates 20*a*, 20*b* have the same deflection in the stacking direction. In the first embodiment, areas of cross sections of the first through fourth side plates 60*a* through 60*d* in a direction perpendicular to the stacking direction have predetermined values, respectively. Specifically, the thickness of the first and third side plates 60*a*, 60*c* are larger than the thickness of the second and fourth plates 60*b*, 60*d*.

As shown in FIGS. 1 and 2, the spacer member 22 has a rectangular shape having predetermined dimensions such that the spacer member 22 is positioned inside the casing 24. The thickness of the spacer member 22 is selected such that the dimensional variation in the stacking direction of the stack body 14 is absorbed, and the desired tightening force is applied to the stack body 14. For example, the spacer member 22 is made of insulating material such as polycarbonate (PC) resin or phenol resin. However, the use of the spacer member 22 is not essential to carry out the present invention. The spacer member 22 may not be used in the case where the dimensional variation in the stacking direction is absorbed by the elasticity of the first and second metal separators 32, 34, for example.

Next, operation of the fuel cell stack 10 will be described below.

Figure 4:
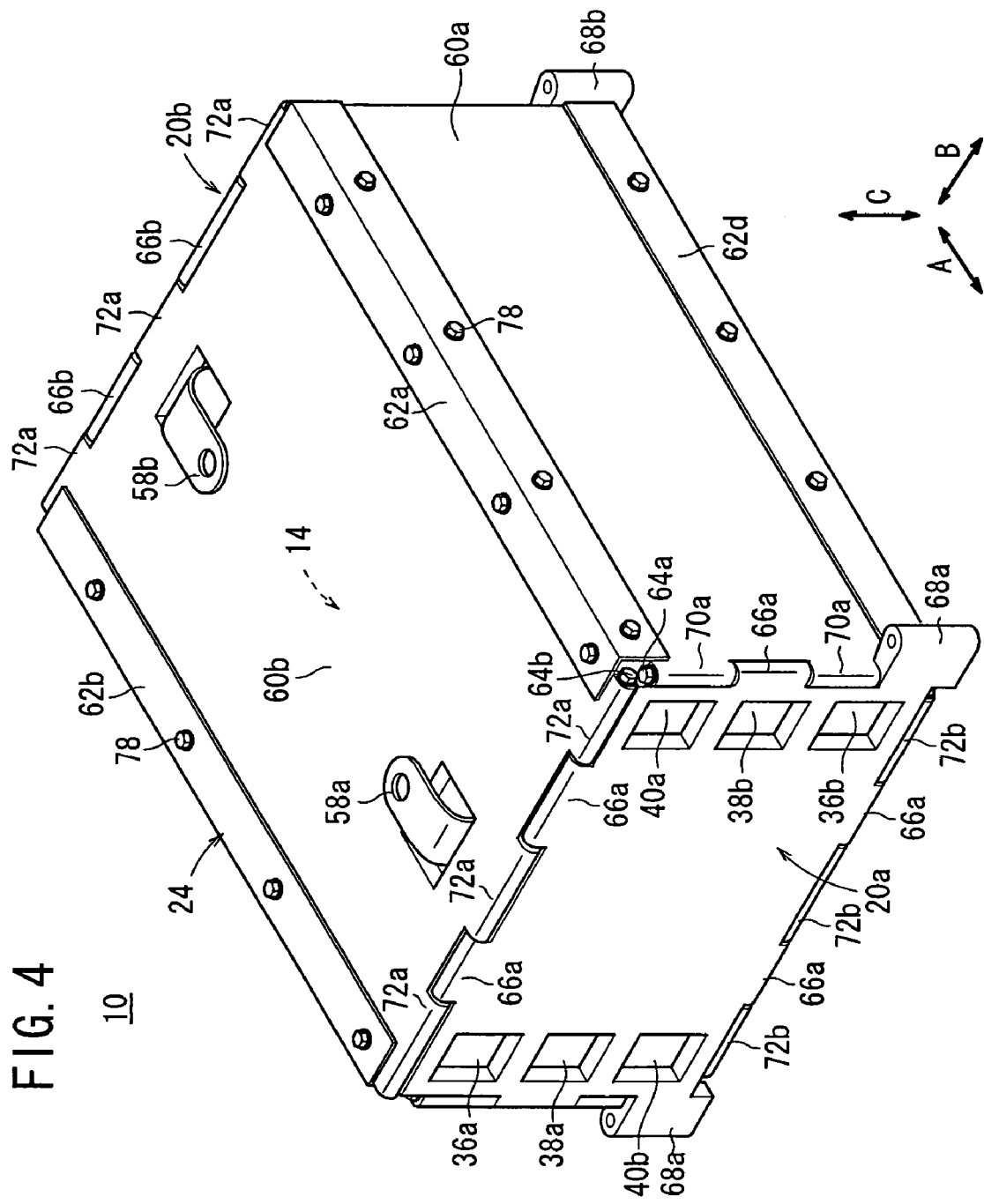
FIG. 4 is a perspective view showing the fuel cell stack.

Firstly, as shown in FIG. 4, an oxygen-containing gas is supplied to the oxygen-containing gas supply passage 36*a* from the end plate 20*a* of the fuel cell stack 10. A fuel gas such as a hydrogen-containing gas is supplied to the fuel gas supply passage 40*a*. Further, a coolant such as pure water, an ethylene glycol or an oil is supplied to the coolant supply passage 38*a*. Thus, the oxygen-containing gas, the fuel gas, and the coolant are supplied to each of the unit cells 12 stacked together in the direction indicated by the arrow A to form the stack body 14. The oxygen-containing gas, the fuel gas, and the coolant flow in the direction indicated by the arrow A (see FIGS. 1 and 2).

As shown in FIG. 3, the oxygen-containing gas flows from the oxygen-containing gas supply passage 36*a* into the oxygen-containing gas flow field 52 of the second metal separator 34. The oxygen-containing gas flows along the cathode 46 of the membrane electrode assembly 30 for inducing an electrochemical reaction at the cathode 46. The fuel gas flows from the fuel gas supply passage 40*a* into the fuel gas flow field 48 of the first metal separator 32 for inducing an electrochemical reaction at the anode 44.

Thus, in each of the membrane electrode assemblies 30, the oxygen-containing gas supplied to the cathode 46, and the fuel gas supplied to the anode 44 are consumed in the electrochemical reactions at catalyst layers of the cathode 46 and the anode 44 for generating electricity.

After the oxygen in the oxygen-containing gas is consumed at the cathode 46, the oxygen-containing gas flows into the oxygen-containing gas discharge passage 36*b*, and is discharged to the outside from the end plate 20*a*. Likewise, after the fuel gas is consumed at the anode 44, the fuel gas flows into the fuel gas discharge passage 40*b*, and is discharged to the outside from the end plate 20*a*.

The coolant flows from the coolant supply passage 38*a* into the coolant flow field 50 between the first and second metal separators 32, 34, and flows in the direction indicated by the arrow B. After the coolant is used for cooling the membrane electrode assembly 30, the coolant flows into the coolant discharge passage 38*b*, and is discharged to the outside from the end plate 20*a*.

In the first embodiment, as shown in FIG. 5, the first and second short side plates 60*a*, 60*b* having the width L1 and the second and fourth long side plates 60*b*, 60*d* having the width L2 are provided. The areas of cross sections of the first through fourth side plates 60*a* through 60*d* in the direction perpendicular to the stacking direction have predetermined values, respectively.

Therefore, when the rectangular end plates 20*a*, 20*b* are used, the sides of the end plates 20*a*, 20*b* have substantially the same deflection. Thus, the surface pressure distribution is uniform in each of the unit cells 12. Accordingly, the power generation performance and the sealing characteristics of the unit cells 12 are improved effectively.

Figure 6:
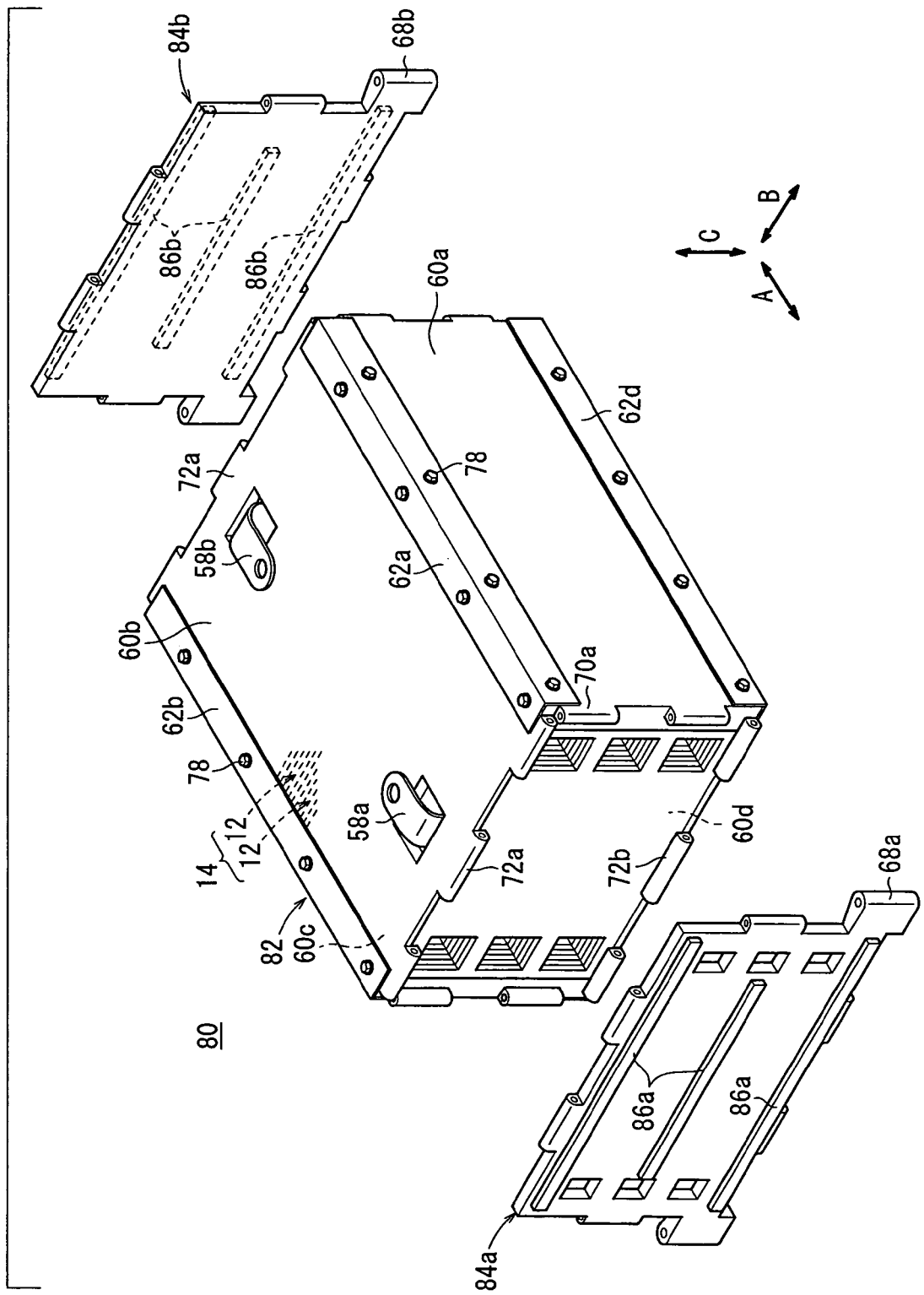
FIG. 6 is an exploded perspective view schematically showing part of a fuel cell stack according to a second embodiment of the present invention.

FIG. 6 is an exploded perspective view showing part of a fuel cell stack 80 according to a second embodiment of the present invention. In the second embodiment, the constituent elements that are identical to those of the fuel cell stack 10 according to the first embodiment are labeled with the same reference numeral, and description thereof will be omitted. Likewise, in third and fourth embodiments as described later, the constituent elements that are identical to those of the fuel cell stack 10 according to the first embodiment are labeled with the same reference numeral, and description thereof will be omitted.

The fuel cell stack 80 has a box-shaped casing 82 including rectangular end plates 84*a*, 84*b*. The rigidity of long sides of the end plates 84*a*, 84*b* in the direction indicated by the arrow B and the rigidity of short sides of the end plates 84*a*, 84*b* in the direction indicated by the arrow C are substantially the same so that the respective sides of the end plates 84*a*, 84*b* have substantially the same deflection in the stacking direction indicated by the arrow A.

In the second embodiment, the dimension of the end plates 84*a*, 84*b* in the direction indicated by the arrow B is larger than the dimension of the end plates 84*a*, 84*b* in the direction indicated by the arrow C. Because of the difference of the dimensions, the rigidity of the end plates 84*a*, 84*b* in the direction indicated by the arrow B is lower than the rigidity of the end plates 84*a*, 84*b* in a direction indicated by the arrow C. Therefore, a plurality of, e.g., three ribs 86*a*, 86*b* are provided on each outer surface of the end plates 84*a*, 84*b* at predetermined intervals.

Areas of cross sections of the first through fourth side plates 60*a* through 60*d* in the direction perpendicular to the stacking direction indicated by the arrow A are substantially the same.

In the second embodiment, the ribs 86*a*, 86*b* extending in the direction indicated by the arrow B are provided on the end plates 84*a*, 84*b* elongated in the direction by the arrow B. Therefore, the rigidity of the end plates 84*a*, 84*b* against deflection in the direction indicated by the arrow B is improved. Consequently, the rigidity of the end plates 84*a*, 84*b* in the direction indicated by the arrow B and the rigidity of the end plates 84*a*, 84*b* in the direction indicated by the arrow C are substantially the same, and it is possible to achieve substantially the same deflection in the respective sides of the end plates 84*a*, 84*b*.

Further, the second embodiment is carried out simply by providing the three ribs 86*a*, 86*b* extending in the direction indicated by the arrow B on each of the end plates 84*a*, 84*b*. Therefore, the end plates 84*a*, 84*b* have the economical structure.

The areas of cross sections of the first through fourth side plates 60*a* through 60*d* in the direction perpendicular to the stacking direction are substantially the same. Therefore, the first through fourth side plates 60*a* through 60*d* have substantially the same rigidity against expansion and contraction in the stacking direction. Thus, when a same load is applied to each side of the end plates 84*a*, 84*b*, the variation of deflection between the respective sides of the end plates 84*a*, 84*b* is reliably prevented, and the uniform surface pressure distribution is achieved.

Figure 7:
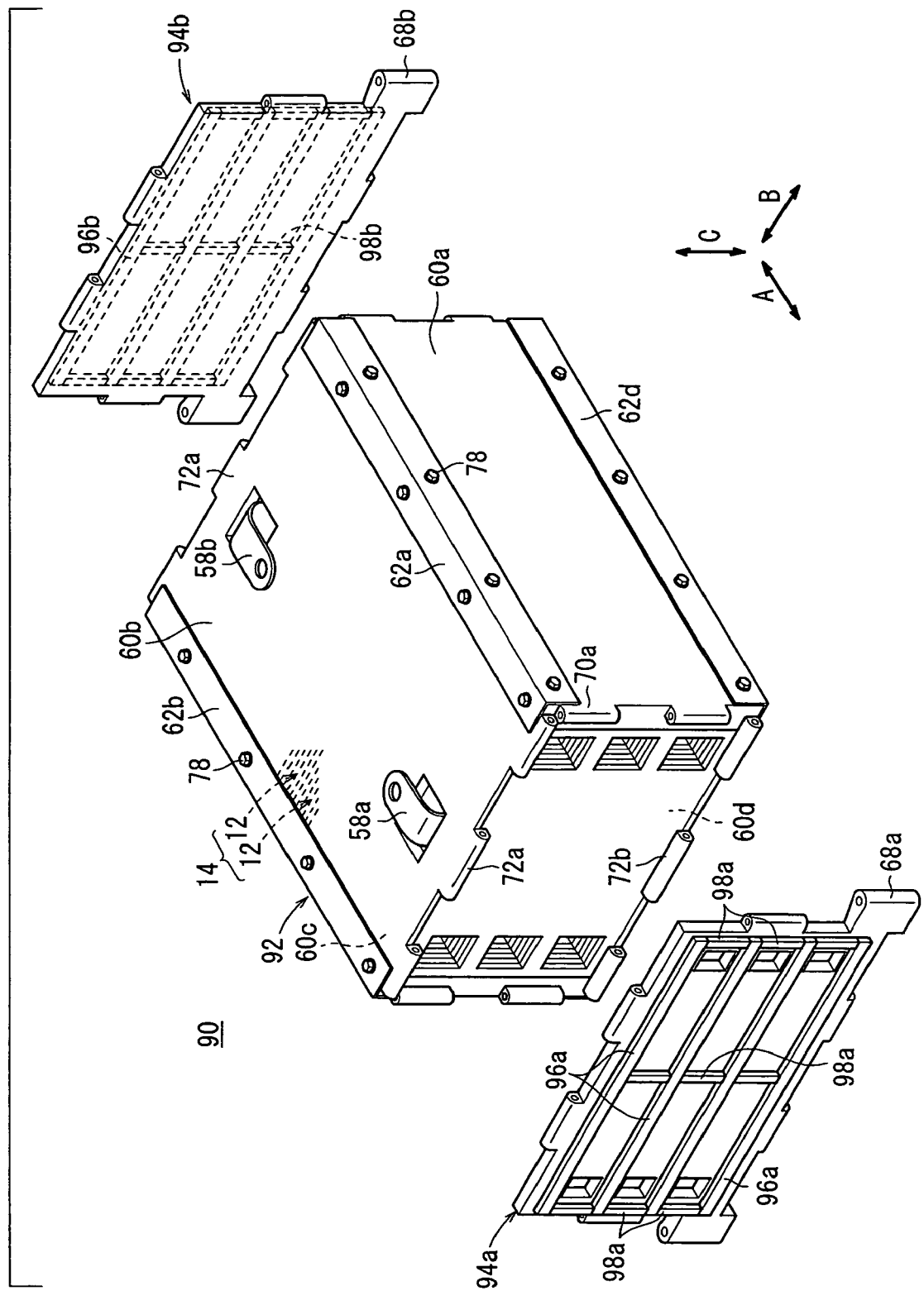
FIG. 7 is an exploded perspective view schematically showing part of a fuel cell stack according to a third embodiment of the present invention.

FIG. 7 is an exploded perspective view showing part of a fuel cell stack 90 according to the third embodiment.

The fuel cell stack 90 has a box-shaped casing 92 including rectangular end plates 94*a*, 94*b*. Respective sides of the end plates 94*a*, 94*b* have substantially the same deflection in the stacking direction indicated by the arrow A.

In the third embodiment, a plurality of, e.g., four long ribs 96*a*, 96*b* extending in the direction indicated by the arrow B are arranged at predetermined intervals in the direction indicated by the arrow C on outer surfaces of the end plates 94*a*, 94*b* elongated in the direction indicated by the arrow B. Further, a plurality of, e.g., three short ribs 98*a*, 98*b* are arranged at predetermined intervals in the direction indicated by the arrow B on the outer surfaces of the end plates 94*a*, 94*b*.

In the third embodiment, the four long ribs 96*a*, 96*b* extending in the direction indicated by the arrow B and the three short ribs 98*a*, 98*b* extending in the direction indicated by the arrow c are provided on the end plates 94*a*, 94*b*. Therefore, the same advantages as with the first and second embodiments can be obtained. For example, the rigidity of the end plates 94*a*, 94*b* in the direction indicated by the arrow B and the rigidity of the end plates 94*a*, 94*b* in the direction indicated by the arrow C are substantially the same, and the respective sides of the end plates 94*a*, 94*b* have substantially the same deflection in the stacking direction.

The numbers of the long ribs 96*a*, 96*b*, and the number of the short ribs 98*a*, 98*b* can be selected arbitrarily. At this time, the total cross sectional area of the long ribs 96*a*, 96*b* is larger than the total cross sectional area of the short ribs 98*a*, 98*b* so that the rigidity of the end plates 94*a*, 94*b* in the direction indicated by the arrow B and the rigidity of the end plates 94*a*, 94*b* in the direction indicated by the arrow C are the same.

Figure 8:
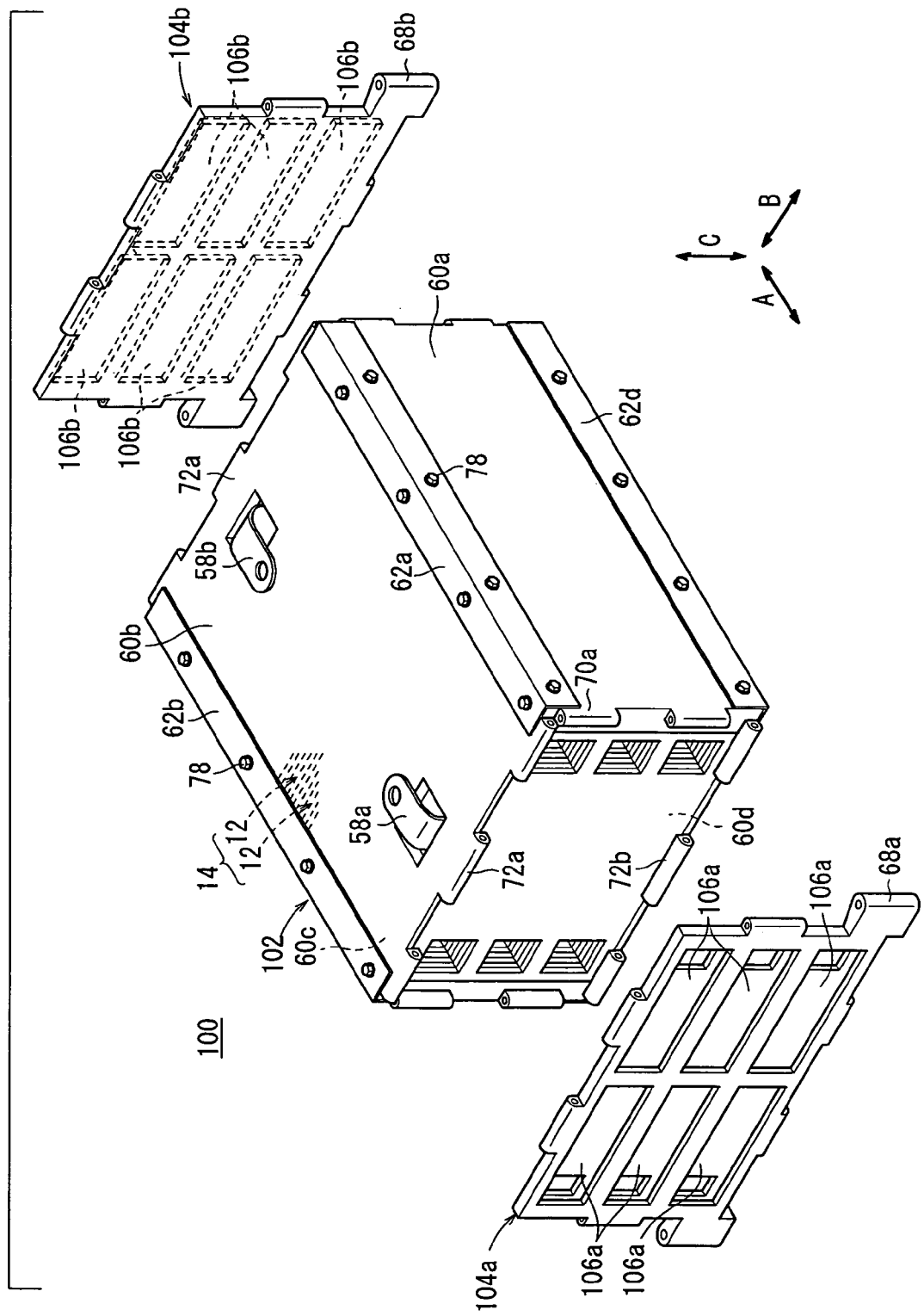
FIG. 8 is an exploded perspective view schematically showing part of a fuel cell stack according to a fourth embodiment of the present invention.
Figure 9:
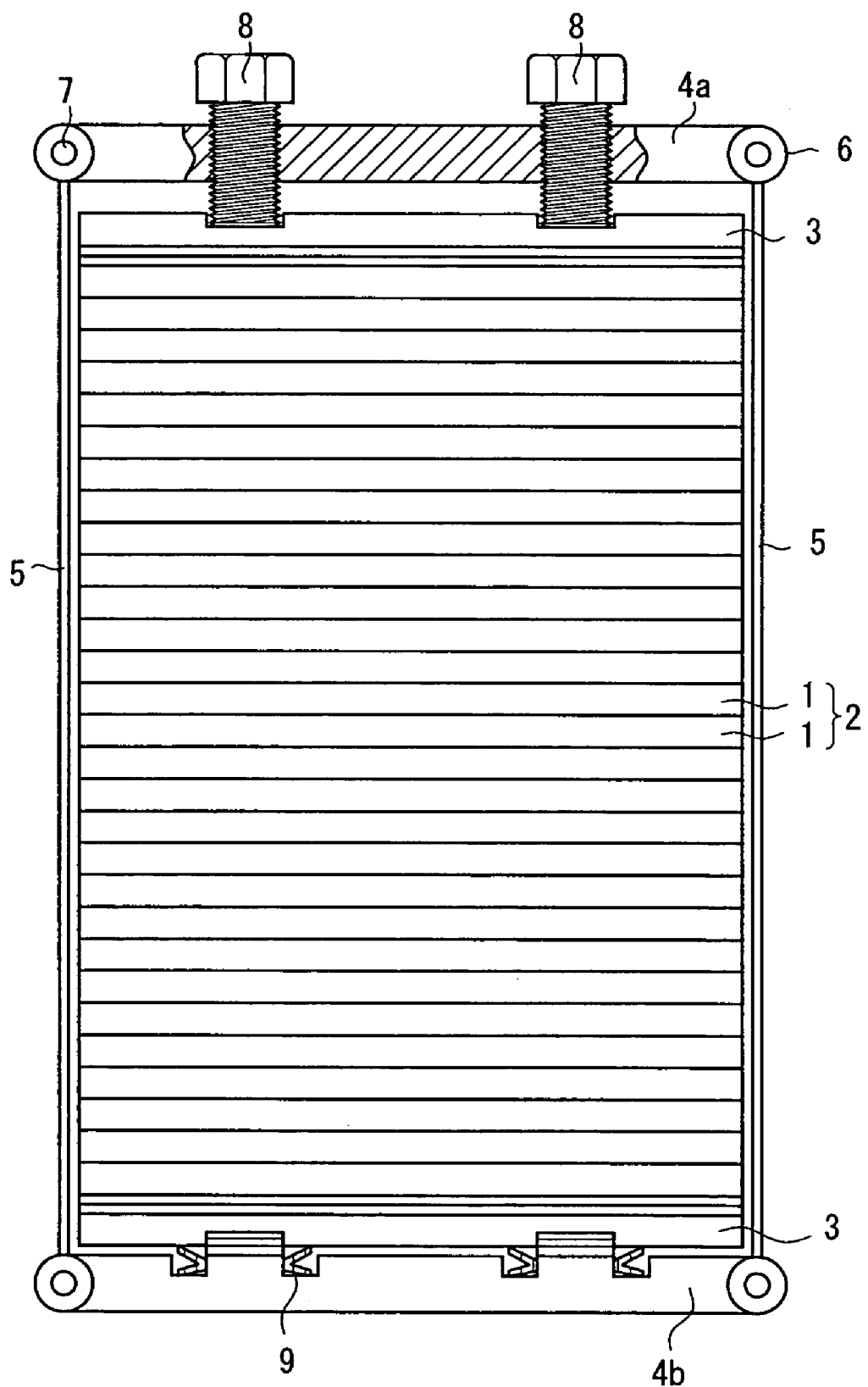
FIG. 9 is a view schematically showing a conventional fuel cell stack.

FIG. 8 is an exploded perspective view showing part of the fuel cell stack 100 according to the fourth embodiment of the present invention.

The fuel cell stack 100 has a box-shaped casing 102 including rectangular end plates 104*a*, 104*b*. Respective sides of the end plates 104a, 104b have substantially the same deflection in the stacking direction indicated by the arrow A.

In the fourth embodiment, six thin sections 106a in two columns in the direction indicated by the arrow B and in three rows in the direction indicated by the arrow C are formed on an outer surface of the end plate 104a elongated in the direction indicated by the arrow B. Likewise, six thin sections 106b in two columns in the direction indicated by the arrow B and in three rows in the direction indicated by the arrow C are formed on an outer surface of the end plate 104b elongated in the direction indicated by the arrow B. The thin sections 106a, 106b are elongated in the direction indicated by the arrow B.

In the fourth embodiment, the six thin sections 106a are provided on the end plate 104a, and the six thin sections 106b are provided on the end plate 104b. Therefore, in particular, the rigidity of the end plates 104a, 104b in the direction indicated by the arrow C is lowered. Consequently, the rigidity of the end plates 104a, 104b in the direction indicated by the arrow B and the rigidity of the end plates 104a, 104b in the direction indicated by the arrow C are substantially the same. Therefore, in the fourth embodiment, the same advantages as with the first through third embodiments can be obtained.

In the first through fourth embodiments, the angle members 62a through 62d are used as the coupling members for example. However, it is not essential to use the angle members 62a through 62d. For example, the first through fourth side plates 60a through 60d may have flanges which can be bent such that the flanges can be fixed by screws to couple the first through fourth side plates 60a through 60d with each other. Alternatively, the first through fourth side plates 60a through 60d may be combined together by welding.

In the present invention, when the rectangular end plates are used, simply by determining cross sectional areas or shapes of the respective side plates, the sides of the end plates have substantially the same deflection in the stacking direction. Therefore, with the simple structure, the surface pressure distribution is uniform in each of the unit cells. Accordingly, the power generation performance and the sealing characteristics of the unit cells are improved effectively.

Further, in the present invention, the rigidity of the long sides of the end plates and the rigidity of the short sides of the end plates are substantially the same. With the simple structure, the sides of the end plates have substantially the same deflection in the stacking direction. Further, the present invention may be carried out simply by providing thick sections or thin sections on the end plates. Therefore, the end plates have the economical structure.

Further, the areas of cross sections of the side plates in the direction perpendicular to the stacking direction are substantially the same. Therefore, the side plates have substantially the same rigidity against expansion and contraction in the stacking direction. Thus, the variation of deflection between the respective sides of the end plates is reliably prevented, and the uniform surface pressure distribution is achieved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising:

a box-shaped casing; and a stack body provided in said box-shaped casing, said stack body being formed by stacking a plurality of unit cells in a stacking direction, said unit cells each including an electrolyte electrode assembly and a pair of separators sandwiching said electrolyte electrode assembly, said electrolyte electrode assembly including a pair of electrodes, and an electrolyte interposed between said electrodes, said casing comprising:

rectangular end plates provided at opposite ends of said stack body in the stacking direction; and a plurality of side plates provided on sides of said stack body, said plurality of side plates comprising short side plates coupled to short sides of said end plates and long side plates coupled to long sides of said end plates, wherein the short side plates are thicker than the long side plates such that all sides of said end plates have substantially the same deflection in the stacking direction to form a surface pressure distribution that is uniform in the stacking direction in each of said plurality of unit cells.

2. A fuel cell according to claim 1, wherein areas of cross sections of said side plates in a direction perpendicular to the stacking direction are substantially the same.

3. A fuel cell stack comprising:

a box-shaped casing; and a stack body provided in said box-shaped casing, said stack body being formed by stacking a plurality of unit cells in a stacking direction, said unit cells each including an electrolyte electrode assembly and a pair of separators sandwiching said electrolyte electrode assembly, said electrolyte electrode assembly including a pair of electrodes, and an electrolyte interposed between said electrodes, said casing comprising:

rectangular end plates provided at opposite ends of said stack body in the stacking direction; and a plurality of side plates provided on sides of said stack body, and coupled to respective sides of said end plates;

wherein the rigidity of long sides of said end plates and the rigidity of short sides of said end plates are substantially the same such that said sides of said end plates have substantially the same deflection in the stacking direction to form a surface pressure distribution that is uniform in the stacking direction in each of said plurality of unit cells.

4. A fuel cell stack according to claim 3, wherein said end plates partially include thick sections or thin sections for changing the thickness so that the rigidity of long sides of said end plates and the rigidity of short sides of said end plates are substantially the same.

5. A fuel cell stack according to claim 4, wherein said end plates include a plurality of ribs as said thick sections at least extending in a direction of said long sides.

6. A fuel cell stack according to claim 3, wherein areas of cross sections of said side plates in a direction perpendicular to the stacking direction are substantially the same.

* * * * *